2,057,099

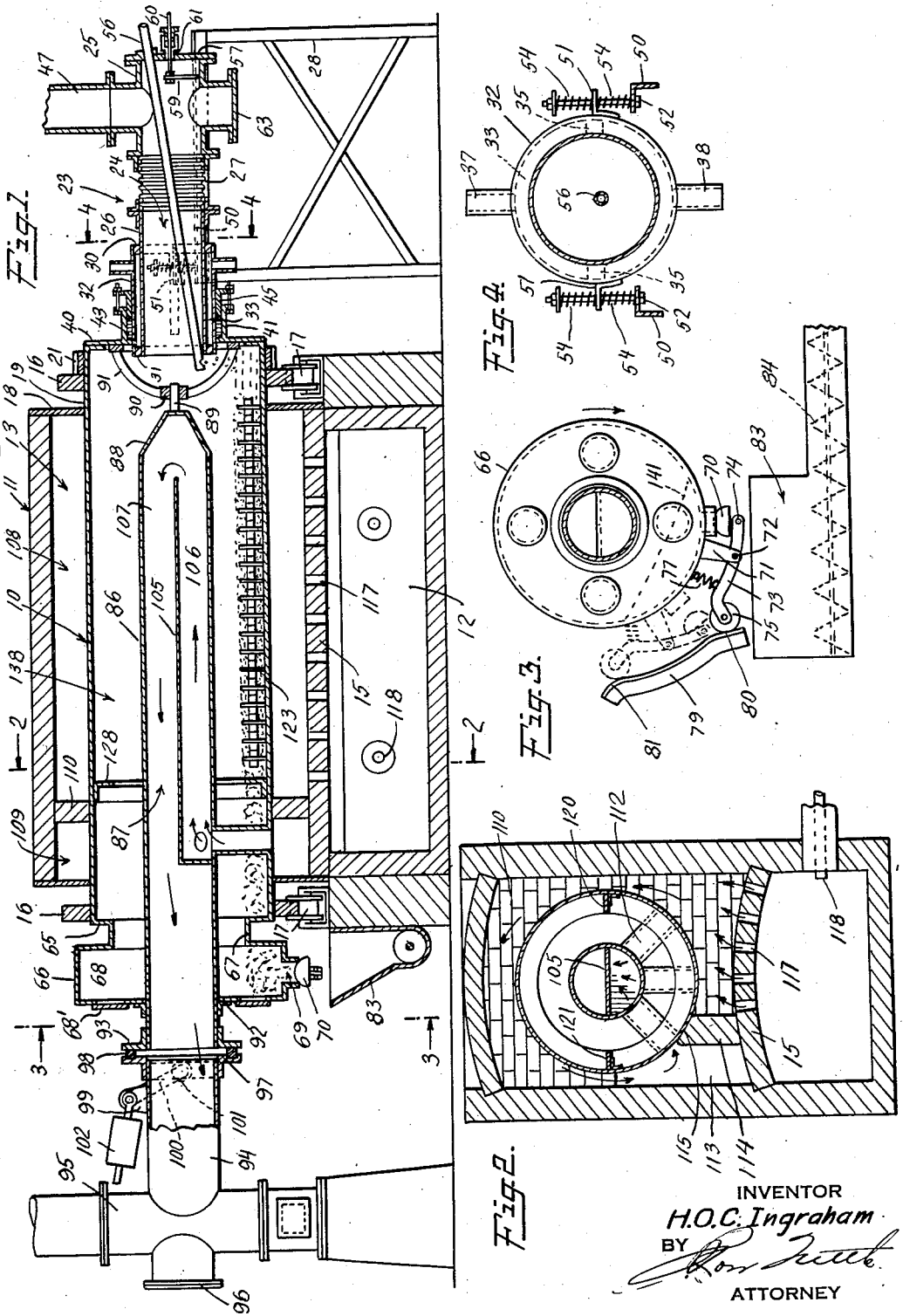
Oct. 13, 1936. H. O. C. INGRAHAM 2,057,099
PRODUCTION OF SULPHUR DIOXIDE
Filed March 10, 1933 2 Sheets-Sheet 1
INVENTOR
H.O.C. Ingraham
BY
ATTORNEY Oct. 13, 1936.  H. O. C. INGRAHAM  2,057,099
PRODUCTION OF SULPHUR DIOXIDE
Filed March 10, 1933   2 Sheets-Sheet 2
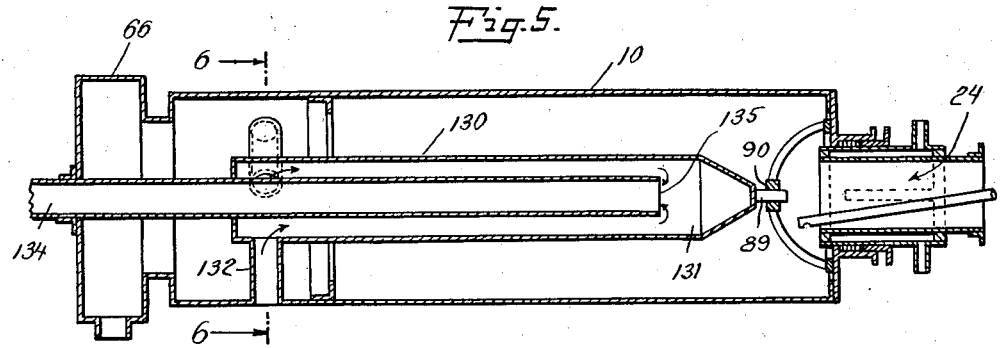
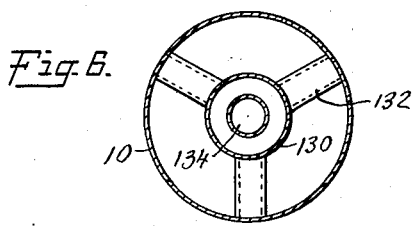
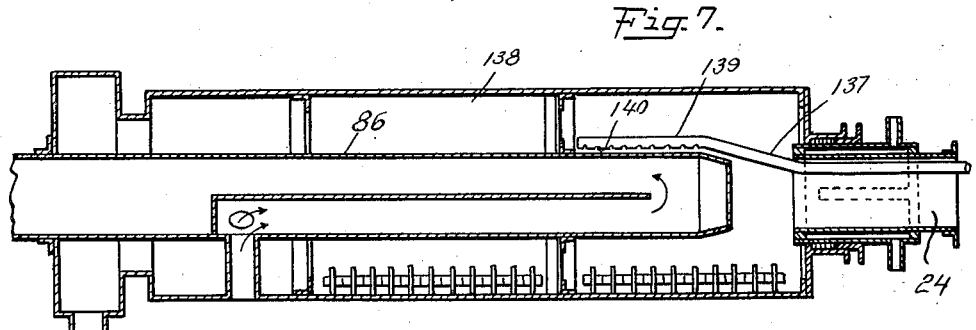
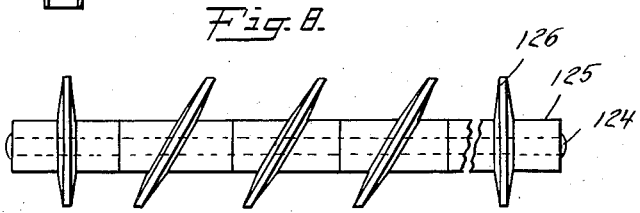
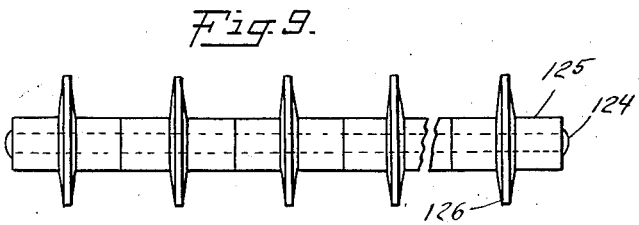
INVENTOR
H.O.C. Ingraham
BY
ATTORNEY Patented Oct. 13, 1936

UNITED STATES PATENT OFFICE 2,057,099

PRODUCTION OF SULPHUR DIOXIDE

Harold O. C. Ingraham, Greenwich, Conn., assignor to General Chemical Company, New York, N. Y., a corporation of New York Application March 10, 1933, Serial No. 660,197

7 Claims. (Cl. 263—22)

This invention relates to methods and apparatus for the production of gas mixtures rich in sulphur dioxide, and is more particularly directed to the formation of sulphur dioxide by decomposition of acid sludges such as acid sludges constituting waste products of processes for refining petroleum and other oil distillates with sulphuric acid.

Acid sludges contain relatively large quantities of sulphuric acid, free or combined. A sludge of this character presents problems both with respect to disposal of the sludge where no attempt is made to recover the acid content thereof, and also in connection with the provision of satisfactory processes for separating and recovering sulphur values from the sludge. Numerous processes have been suggested for treating acid sludges for separation and recovery of sulphuric acid as such. Other proposals have been directed to the recovery, from acid sludges, of sulphur as sulphur dioxide, and the subsequent utilization of the same in the production of sulphuric acid.

The present invention contemplates the recovery of sulphur values from acid sludges by decomposing acid sludge by heating with the formation of a gas mixture rich in sulphur dioxide, and the production of solid carbonaceous residue. Decomposition of acid sludges by heat treatments have heretofore been suggested. The reactions involved, however, are endothermic and require the utilization of relatively large quantities of extraneous heat. In general, prior methods for decomposing acid sludges have been carried out in such manner as to be wasteful of heat, and as a rule have been of such nature as not to fully permit desired control of the degree of decomposition of the sludge.

As one of the principal objects, the invention aims to provide a process for the recovery of sulphur compounds from acid sludges carried out in such manner that decomposition of the sludge is effected by utilization of minimum amounts of extraneous heat and in which a high rate of sludge decomposition per unit area of decomposing surface is attained, whereby the cost of decomposition of the sludge and the investment in apparatus are relatively small. A particular object of the invention lies in the provision of a method and apparatus for decomposing acid sludge, preferably in a rotary retort, by which the heat transfer surface for transmitting heat to the body of sludge undergoing decomposition is largely increased. The invention also provides a method and apparatus by which the degree of decomposition of the acid sludge may be easily controlled. A further outstanding object of the invention comprises the provision of apparatus for effecting a rapid penetration of heat through the body of sludge being decomposed by means of which the amount of sludge which may be decomposed in an apparatus unit of given size is greatly increased.

The invention also comprises as an important part, improved apparatus by means of which acid sludge and similar material may be economically decomposed.

A further appreciation of the objects and advantages of the invention may be had from a consideration of the following description taken in connection with the accompanying drawings in which,—

Fig. 1 is a vertical longitudinal section of one preferred embodiment of acid sludge decomposing retort;

Fig. 2 is a vertical cross-section taken on the line 2—2 of Fig. 1;

Fig. 3 is an end elevation taken approximately on the line 3—3 of Fig. 1;

Fig. 4 is a transverse vertical section taken on the line 4—4 of Fig. 1;

Fig. 5 is a vertical longitudinal section of a modified form of decomposing retort;

Fig. 6 is a transverse vertical section on the line 6—6 of Fig. 5;

Fig. 7 is a vertical longitudinal section of another modified retort, and

Figs. 8 and 9 are elevations of kneading devices carried in the retort.

The apparatus shown in Figs. 1-3 comprises principally a cylindrical retort or shell 10, pitched slightly toward the coke outlet end, rotatably mounted in a furnace setting 11 built of refractory material. The furnace has in the base thereof a combustion chamber 12, separated from the retort chamber 13 by a horizontal arch 15.

On either end of the shell 10 are circular tires 16 resting in guide rollers 17. The end walls 18 of the retort chamber 13 may be arranged at 19 in any suitable manner to substantially prevent escape of hot gases around the surface of the shell. Fixed to the periphery of the retort at one end is a drive gear 21 which meshes with a pinion driven by a shaft, neither of which is shown.

The end of the retort 10 adjacent the gear drive 21 rotates about a relatively fixed gas outlet connection, represented generally by reference numeral 23, affording a gas outlet conduit 24. Connection 23 comprises principally a T 25 and a cylindrical sleeve 26 joined together by a suitable flexible coupling 27, T 25 being ridigly supported by a framework 28. Welded or otherwise attached to the outer surface of sleeve 26 are spaced rings 30 and 31 which together with cylindrical casing 32 and the adjacent outer surface of sleeve 26 form a chamber 33 for cooling liquid. Disposed in chamber 33 are longitudinal ribs 35 abutting at one end against the inner vertical surface of ring 30. Cooling liquid may be introduced into chamber 32 through connection 37 and discharged through outlet 38. From Fig. 1 of the drawings, it will be seen that ribs 35 cause cooling liquid to circulate efficiently through chamber 33.

Sleeve 26 and casing 32 extend through an opening in the vertical end wall 40 of shell 10. Projecting outwardly from end wall 40 is a short cylindrical sleeve 41 which, with a small portion of end wall 40, forms a seat for packing material 43. A packing gland 45, bolted to and rotated with shell extension 41, holds the packing 43 in place, thus preventing gas leakage between the opening in the end wall 40 of the shell, and the adjacent outer surface of casing 32. In this construction, it will be seen packing 43 lies directly in contact with the cooled outer surface of casing 32, such arrangement preventing rapid deterioration of the packing 43 by overheating by the hot gases leaving the retort through the conduit 24.

Though held in substantially fixed position relative to rotating shell 10, the sleeve 26 and the attached casing 32 may be subjected to some slight motion imparted thereto because of uneven movement of retort 10. In Fig. 4, there are shown fixed angle irons 50 which are supported rigidly by frame 28. Attached to the outer surfaces of casing 32 are angle irons 51 through which pass vertical bolts 52 rigidly secured to angles 50. Thus, angle irons 50 in conjunction with bolts 52 and the encircling springs 54 flexibly support sleeve 26 and casing 32, springs 54 taking up any motion imparted to the sleeve 26 and casing 32 by reason of irregular rotation of shell 10 about the axis thereof.

A sludge inlet pipe 56 is rigidly supported by end plate 57 of T 25, the sludge conduit extending through T 25, coupling 27 and sleeve 26, to feed acid sludge into the retort 10. Pipe 56 is connected to an acid sludge reservoir not shown. A hoe-like scraper 59 is attached to the end of a rod 60 slidably mounted in a gas-tight bearing 61 in end plate 57. Scraper 59 may be moved longitudinally through sleeve 26, coupling 27 and T 25 to remove dust, accretions, or condensates collecting in the gas outlet conduit 24. Such materials may be discharged from T 25 by removal of bottom plate 63. Gases and vapors formed in the retort may be discharged therefrom through pipe 47, and conducted to a cooler or condenser, not shown, for a purpose hereinafter noted.

Connected to the opposite end wall 65 of the shell 10 is a drum-like head 66 into which solid residue from the decomposing zone is fed over a ledge 67. Clean-out holes 68 are normally covered by plates 68'. In the periphery of drum 66 is a discharge opening 69 adapted to be closed by a plug 70.

The construction and operation of the opening and closing mechanism for plug 70 is shown in elevation in Fig. 3. Projecting outwardly from drum 34 near discharge opening 69 is a bracket 71 in which is pivoted, at 72, a lever 73. One end of the lever is pivotally connected at 74 to the plug, and the opposite end of the lever carries roller 75. Normally, plug 70 is held in the position shown in the full lines in Fig. 3, i. e., closing opening 69, by the action of spring 77. Supported in the position shown in the drawings, is a cam surface 79 which is adapted to be engaged by the roller 75. When the retort is rotating, as the roller rides up incline 80 to the high point on the cam surface, spring 77 is compressed and the plug 70 is withdrawn thus permitting solid residue to be discharged from the head 66 through opening 69 until roller 75 drops off the end 81 of the cam surface, at which time the plug again seats in opening 69 and prevents further discharge of material. The plug 70 is shown in the open position in the dotted lines in Fig. 3. Reference numeral 83 indicates a trough or bin into which the solid residue falls, and from which the residue may be withdrawn continuously by a screw conveyor 84.

Cam 79 is held approximately as indicated in Fig. 3 by adjustable brackets or arms, not shown, by means of which the position of cam surface 79 may be regulated with reference to roller 75. By moving cam surface 79 toward or away from the drum 66, or by altering the vertical position of the cam, the opening and duration of the withdrawal of plug 70 may be varied in accordance with the amount of coke produced and the desired rate of discharge thereof from the retort.

Located concentrically in the main shell 10 is a second cylindrical shell 86 providing an internal heating chamber 87. The end of cylinder 86, adjacent the gas outlet conduit 24, is closed as at 88, and carries stub shaft 89 journaled in bearing 90 supported by spider 91 attached to shell end wall 40. As shown, cylinder 86 has a diameter considerably less than that of shell 10, and projects through an opening 92 in the circular end wall of the discharge head 66. The cylinder 86 is fixed to the drum head and rotates therewith. The end of the cylinder 86, carries a flange 93 and extends to a fixed conduit 94 opening into spent gas stack 95. A normally covered opening 96, diametrically opposite conduit 94, affords means for cleaning the inside of cylinder 86 if necessary.

A gas-tight connection between the ends of cylinder 86 and conduit 94 is effected by means of a collar 97 slidable axially on conduit 94. The vertical face or flange of collar 97 is channeled to receive and retain a packing ring 98. Pivoted to brackets 99, on either side of conduit 94, are levers 100 carrying on one end rollers 101, and weights 102 on the other. Weights 102 through levers 100 and rollers 101, constantly hold packing 98 in gas-tight contact with the vertical face of flange 93.

Before leaving the apparatus, hot gases from combustion chamber 12 are caused to pass twice through the major portion of that section of cylinder 86 lying within the retort 10. As shown particularly in Fig. 2, a partition 105 extends diametrically across one end of heating chamber 87, and forms gas passages 106 and 107.

The retort chamber 13 is divided into a large section 108 and a smaller section 109 by a transverse vertical firewall 110 shown in section in Fig. 1 and in elevation in Fig. 2. The end of gas passage 106 adjacent firewall 110 communicates through three pipe connections 112 with the small section 109 to the left of firewall 110. The latter extends substantially completely across the retort chamber 13 with the exception of a small opening 113, shown in Fig. 2, which provides a passage for gases from large section 108 into the small section 109. Extending upwardly from the top of arch 15 is a vertical baffle 114, the upper edge of which lies adjacent the outer surface of the shell 10, as at 115 in Fig. 2. Baffle 114 extends lengthwise through large section 108 from the transverse wall 110 to the opposite end of the retort section 108 adjacent the sludge inlet end of the retort. As indicated in Fig. 2, that portion of the arch 15 to the right of baffle 114 is perforated as at 117 to permit passage of hot gases from the combustion chamber 12 into large section 108 to envelope the major portion of the retort 10. The combustion chamber 12 is equipped with one or more burners 118 adapted to burn any suitable type of fuel.

The retort 10 is provided on the inside with a pair of oppositely positioned longitudinal ribs 120 and 121, shown in section in Fig. 2, which ribs extend the full length of the retort from end wall 40 to end wall 65. To cut and/or break up material in the retort which may tend to lump, or to stick to the walls during decomposition, a floating bar or cutter 123 may be placed in the shell 10. Two forms of floating members are shown in elevation in Figs. 8 and 9, the type shown in Fig. 8 being preferred. Each member includes a center shaft or rod 124 on which are mounted sleeves 125 carrying disc-like cutting members 126. In Fig. 9, the cutters 126 are positioned perpendicular to shaft 124, while in the preferred form of Fig. 8, the cutters, with the exception of those on the ends of rod 124, are pitched at an appreciable angle with respect to the shaft. Extending inwardly from the inner surface of the shell, at a point near the partition 110, is transverse flange 128 which prevents member 123 from working toward the discharge end of the retort and possibly coming in contact with and puncturing conduits 112. Flange 128 may be perforated to permit passage of coke material therethrough In Figs. 5 and 6, there is shown a modified form of apparatus in which the retort or shell 10, gas outlet conduit 24, discharge drum 66 and associated parts are built substantially as described in connection with Fig. 1. In Fig. 5, however, the construction of the inner heating chamber differs from that shown in Fig. 1. The stub shaft 89, on one end of the cylinder 130 forming heating chamber 131, is journaled in a bearing 90 as in Fig. 1. It will be understood that the retort of Fig. 5 is mounted in a furnace of the same construction as in Fig. 1, the retort and the various partitions in the furnace setting being in the same relative position.

In the apparatus of Fig. 5, hot gases from the furnace enter cylinder 130 and heating chamber 131 through three pipe connections 132, opening at one end into the chamber 109, (Fig. 1) and at the opposite end into the cylinder 130. Disposed within cylinder 130, is a longitudinal cylindrical conduit 134 which connects at the outer end thereof with a fixed conduit, such as 94 (Fig. 1). The hot gases, after passing through the annular space between the inner surface of cylinder 130 and the outer surface of conduit 134, enter the inner end 135 of conduit 134, as indicated by the arrows, pass through conduit 134, and leave the apparatus through a stack 95 to which the outer end of conduit 134 is rotatably connected.

Fig. 7 shows a modified arrangement for introducing acid sludge into the decomposing chamber. In this construction, the retort 10, the internal heating chamber 86, and sleeve 26 and casing 32 and associated parts are built as in Fig. 1. The sludge inlet pipe 137 projects into the annular decomposition chamber 138 between the inner surface of the shell 10 and the outer surface of the heating chamber 86 in such manner that the discharge end 139 of the inlet pipe 137 is immediately above the axis of the cylinder 86. The under side of the end 139 of the sludge inlet pipe may be perforated as at 140, so that sludge running out of the inlet pipe is distributed over the surface of cylinder 86. Gases and vapors generated in the retort are discharged through outlet conduit 24 as in other modifications of the apparatus.

As noted, the invention principally relates to methods and apparatus for decomposing acid sludges formed in the refining of oils by sulphuric acid treatment. Decomposition of acid sludges with the formation of sulphur dioxide gas and production of coke may be carried out in conjunction with apparatus described substantially as follows:

Referring particularly to apparatus illustrated in Figs. 1–3, the burners 118 are regulated so as to create in the retort temperatures of about 300° F.–500° F. The hot gases from the combustion chamber 12 rise through perforations 117 in arch 15, and are caused by the vertical partition 110 to pass substantially completely around the outside of the shell 10 as indicated by the arrows in Fig. 2. After having passed around the major portion of the shell 10, i. e., that part disposed in chamber 108 of the retort chamber 13, the hot gases flow through opening 113 (Fig. 2) into the small chamber 109 to the left of the vertical partition 110 (Fig. 1). From this chamber, the gases are conducted through pipes 112 into the closed end of heating passage 106 on one side of the partition 105. The gases flow through passage 106 in the direction of the arrows in Fig. 1, around the end of the partition 105, and in the reverse direction through passage 107 on the opposite side of partition 105, finally leaving the heating chamber 87 in cylinder 86 through the conduit 94 opening into stack 95. The burners 118 are preferably adjusted so that the temperature of the gases on discharge from the apparatus is not substantially less than about 400° F. When the apparatus is heated to the desired degree, the shell 10 is rotated through gear 21 at a suitable rate.

As noted, inlet pipe 56 is connected to a suitable acid sludge reservoir. Acid sludge, containing for example 45% sulphuric acid, 35% oils and tarry hydrocarbons and 20% water, is fed into the inlet end of the retort through pipe 56 at a suitable rate, for example, by means of a variable speed gear pump. Decomposition of the sludge is substantially immediately initiated with the production of a sulphur dioxide gas mixture and partly decomposed sludge material. In the annular decomposition chamber 138, a body of sludge material in various stages of decomposition is formed which may have a cross-sectional configuration similar to the area lying between the circumference of the shell 10, and the dotted line 141 (Fig. 3). On rotation of the retort, the material therein contacts with one or the other of the inner ribs 120 or 121 which raises the material and also the floating member 123 until the angle of repose is exceeded, at which time the material is tumbled over itself cascading down onto the lower surface of the drums. The material is gradually worked from the sludge inlet end of the retort toward the discharge drum 66.

As the shell 10 is immediately above the arch 15, the bottom of the shell is subjected to the high temperatures of the gas entering retort section 108. Accordingly, the underside of the body of material in the retort is in direct contact with the heated surface of the retort. As hot furnace gases are simultaneously flowing through passages 106 and 107 in cylinder 86, it will be seen that large quantities of heat are radiated from the surface of cylinder 86 outwardly into the annular decomposition chamber 138. Because of this arrangement, the upper face of the material in the retort, the surface line of which may be, for example, as indicated by the dotted line 141 (Fig. 3), is subjected to heat radiated from the surface of cylinder 86. In this manner, the upper and lower surfaces of the body of sludge material are continuously subjected directly to heat. The particular construction disclosed provides approximately 50% increase in heat transfer surface, and reduces the distance through which the heat will be forced to penetrate through the body of sludge. Capacity of the unit is thus increased and higher fuel efficiency obtained.

The decomposition reaction taking place in all parts of the retort involves principally the reduction of the free and combined sulphuric acid contained in the sludge by the hydrogen of hydrocarbons and/or by the carbonaceous matter contained in the sludge with the production of sulphur dioxide, water vapor and coke. The gas mixture generated by the reaction also contains relatively large amounts of hydrocarbon vapor, and lesser quantities of carbon dioxide, carbon monoxide, nitrogen etc. A gas mixture of this nature passes out of the retort through outlet conduit 24 and outlet pipe 47 to a cooler not shown.

During rotation of the retort, the floating member 123 is intermittently lifted by the longitudinal ribs 120 and 121, and dropped back to the bottom of the retort. This acts to break up lumps which may tend to form, and also to knock from the inner walls of the shell 10 any accretions which may adhere thereto. Because of the cutting disks 126, this action of the floating member 123 has the advantage of effecting a desirable slicing of bodies of sludge material, thus aiding in disintegration and decomposition of the latter. As disks 126 are separate and noncontinuous, i. e. do not form a helical flight, there is substantially no tendency to increase the rate of movement of material through the retort, although the same desirable slicing action effected by a helicoid flight is obtained. When employing the preferred floating member shown in Fig. 8, because of the pitch of the disks, substantially the whole body of sludge material is at one time or another subjected to the slicing action of the disks. Solid residue works over or through the perforations of flange 128, and eventually over ledge 67 into the interior of drum 66 from which coke is discharged.

The discharge mechanism shown in Fig. 3 is such that coke is intermittently discharged from the drum 66 without permitting air to enter the retort. The shell 10 rotates in the direction of the arrow (Fig. 3) and as the opening 69 reaches the low point, roller 75 engages the cam 79, plug 70 is withdrawn, and opening 69 is uncovered for an interval of time during which the opening 69 is passing through approximately 30° of rotation, as shown in Fig. 3. Since opening 69 is covered with coke material during this period, substantially no air enters the retort. When roller 75 drops off the cam surface, opening 69 is again closed. The coke discharged from the retort into trough 83 may be of approximately the following composition:

| | |
|---|---|
| Total acidity | 2.1% $H_2SO_4$ |
| Ash | 1.2% |
| Total volatile matter including $H_2SO_4$ | 32.1% |
| Fixed carbon | 67.7% |

The operation of the process when employing the apparatus shown in Figs. 5 and 6 is substantially the same as that already described in Figs. 1–3 inclusive. In the apparatus of Fig. 5, however, the hot gases entering the cylinder 130 and passing toward the open end of conduit 134 are all at substantially the same temperature, that is, the temperature of all parts of the exterior surface of cylinder 130 is substantially the same.

When employing the modified apparatus shown in Fig. 7, the acid sludge is fed directly through inlet pipe 137 onto the hot outer surface of cylinder 86. In this procedure, the raw acid sludge is first flowed over the hot surface of cylinder 86, and is subjected to an initial preheating before falling into the bottom of the main retort 10. In the drawings, the underside of inlet end 139 is shown perforated. If the sludge being decomposed should be of such nature as to tend to clog up perforations of the perforated pipe, or the ends of nozzles if such are used instead, the difficulties may be overcome by pumping the sludge intermittently, onto the surface of drum 86, by means of a pump of the plunger type, through a water jacketed line which would not extend appreciably into the retort atmosphere.

Acid sludges as formed in the refining of petroleum products may be divided broadly into two classes of different chemical and physical characteristics. Sludges obtained from the treatment of lubricating oils are quite viscous, and have a relatively high organic content and a relatively low acid content, e. g., 30% $H_2SO_4$. On the other hand, sludges obtained from non-lubricating oil are quite fluid, having a relatively low organic content, and a relatively high acid content, e. g., 40% to 65% $H_2SO_4$. When proceeding in accordance with the invention, if sludges of different characteristics are to be decomposed it may be desirable to blend the sludges before feeding the same into the retort. However, the retort may be provided with one or a plurality of sludge inlet pipes so that sludges of different characteristics may be fed into the retort, and blending effected in the retort.

The gaseous products of the decomposition of the sludge in the retort are discharged from the apparatus through outlet pipe 47, and may be passed through a cooler or condenser to lower the temperature of the gases to about atmospheric, to separate condensable vapors from the gas stream. Since decomposition is carried out in the kiln substantially in the absence of air, burning of carbonaceous material therein is prevented and the gases discharged from the reaction chamber are relatively rich in sulphur dioxide which may amount to about 15% to 25% sulphur dioxide by volume. On cooling of the gas stream and separation therefrom of the greater part of the water vapor and condensable hydrocarbons, the gas mixture, which may contain as high as 50–99% sulphur dioxide, the balance comprising principally uncondensed hydrocarbon vapors, carbon dioxide and water, may be utilized directly where a concentrated sulphur dioxide gas is desired, or the gases may be further purified, if desired, diluted with air, and utilized in the manufacture of sulphuric acid.

The invention also affords a method by which decomposition of acid sludge to any degree may be had. For example, where it is desired to carry the decomposition reaction only to that point at which substantially all of the acid contained in the acid sludge is decomposed, thereby producing a coke containing but little sulphuric acid, such result may be obtained by regulating the quantity of acid sludge fed through inlet pipe 30 and the temperature of retort. On the other hand, it might be desired to decompose the sludge in such manner that the coke contains appreciable amounts of undecomposed sulphuric acid, and in other situations, it might be desired to carry decomposition beyond the reduction of all sulphuric acid contained and to such degree as to remove substantial amounts of volatile matter. The desired results may be obtained by regulation of sludge feed and temperature of retort.

I claim:

1. Apparatus for treating material which comprises a rotary drum, means for rotating the drum, a floating member in the drum comprising a shaft adapted to lie adjacent the bottom of the drum longitudinally thereof, a plurality of disks carried by said shaft, at least some of said disks lying in planes disposed at an angle other than a right angle with respect to the axis of the shaft.

2. Apparatus for heat treating materials which comprises a chamber, a shell therein, a heating chamber in the shell, means for feeding material to be treated onto the surface of the heating chamber, means for contacting hot gases with the exterior of the shell, means for flowing hot gases through the heating chamber, and means for withdrawing reaction products from the shell.

3. Apparatus for heat treating materials which comprises a furnace setting having a combustion chamber and a shell chamber, a shell rotatably mounted in the shell chamber, means for rotating the shell, a heating chamber in the shell forming therewith an annular treating chamber, means for feeding material to be treated into one end of the treating chamber, means for causing all of the combustion gases from the combustion chamber to initially envelop the shell and then flow into the heating chamber at a point adjacent the opposite end of the treating chamber, means in said heating chamber including a longitudinally disposed partition for causing said combustion gases to flow through the heating chamber in direction toward said first-mentioned end of the treating chamber and then toward said opposite end of the treating chamber, means for discharging said combustion gases from the apparatus, means for withdrawing reaction gases from the first-mentioned end of the treating chamber, and means for discharging solid material from the opposite end of the treating chamber.

4. Apparatus for heat treating materials which comprises a furnace setting having a combustion chamber and a shell chamber, a shell rotatably mounted in the shell chamber, means for rotating the shell, a heating chamber mounted in the shell for rotation therewith and forming with the shell an annular treating chamber, means for feeding material to be treated into one end of the treating chamber, a partition in the shell chamber near the opposite end of the furnace setting forming a relatively large section including a major portion of the shell and a relatively small chamber including a minor portion of the shell, an opening in the partition, means for feeding gases from the combustion chamber into the large section, and a conduit between the small section and the heating chamber, whereby hot gases are caused to successively envelop the major portion of the shell and then flow through the heating chamber, means for withdrawing gases from the treating chamber and means for discharging solid material from said opposite end of the treating chamber.

5. Apparatus for heat treating material which comprises a furnace setting having a combustion chamber and a shell chamber, a shell rotatably mounted in the shell chamber, means for rotating the shell, a heating chamber mounted in the shell for rotation therewith and forming with the shell an annular treating chamber, means for feeding material to be treated into one end of the treating chamber, a partition in the shell chamber near the opposite end of the furnace setting forming a relatively large section including a major portion of the shell and a relatively small chamber including a minor portion of the shell, an opening in the partition, means for feeding gases from the combustion chamber into the large section, and a conduit between the small section and the heating chamber, whereby hot gases are caused to successively envelop the major portion of the shell and then flow through the heating chamber, means for withdrawing gases from the first-mentioned end of the treating chamber, and means for discharging solid material from said opposite end of the treating chamber.

6. Apparatus for heat treating materials which comprises a furnace setting having a combustion chamber and a shell chamber, a shell rotatably mounted in the shell chamber, means for rotating the shell, a heating chamber mounted in the shell for rotation therewith and forming with the shell an annular treating chamber extending substantially the length of the shell, means for feeding material to be treated into one end of the treating chamber, a partition in the shell chamber near the opposite end of the furnace setting forming a relatively large section including a major portion of the shell and a relatively small chamber including a minor portion of the shell, an opening in the partition, means for feeding gases from the combustion chamber into the large section, and a conduit between the small section and the heating chamber, whereby hot gases are caused to successively envelop the major portion of the shell and then flow through the heating chamber, means for withdrawing spent gases from said opposite end of the heating chamber, means for withdrawing gases from the first-mentioned end of the treating chamber, and means for discharging solid material from said opposite end of the treating chamber.

7. Apparatus for heat treating materials which comprises a furnace setting having a combustion chamber and a shell chamber, a shell rotatably mounted in the shell chamber, means for rotating the shell, a heating chamber mounted in the shell for rotation therewith and forming with the shell an annular treating chamber extending substantially the length of the shell, means for feeding material to be treated into one end of the treating chamber, a floating member in the treating chamber, a plurality of disk-like projections on said member and arranged to knead material on rotation of the shell, a partition in the shell chamber near the opposite end of the furnace setting forming a relatively large section including a major portion of the shell and a relatively small chamber including a minor portion of the shell, an opening in the partition, means for feeding gases from the combustion chamber into the large section, and a conduit between the small section and the heating chamber positioned adjacent said opposite end whereby hot gases are caused to successively envelop the major portion of the shell and then flow through the heating chamber, means for withdrawing spent gases from said opposite end of the heating chamber, means for withdrawing gases from the first-mentioned end of the treating chamber, and means for intermittently discharging solid material from said opposite end of the treating chamber without admitting gas thereto.

HAROLD O. C. INGRAHAM.